(12) United States Patent
Lin

(10) Patent No.: US 6,796,052 B1
(45) Date of Patent: Sep. 28, 2004

(54) STRUCTURE FOR THE ENDPIECE OF TAPE RULE

(75) Inventor: Henry Lin, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 0 days.

(21) Appl. No.: 10/623,599

(22) Filed: Jul. 22, 2003

(51) Int. Cl.$^7$ .............................................. G01B 3/10
(52) U.S. Cl. ........................................ 33/758; 33/770
(58) Field of Search ........................ 33/755, 757, 758, 33/768, 770

(56) References Cited

U.S. PATENT DOCUMENTS

| | | | | |
|---|---|---|---|---|
| 1,066,972 A | * | 7/1913 | Aitken | 33/770 |
| 2,574,272 A | * | 11/1951 | McCully | 33/770 |
| 5,845,412 A | * | 12/1998 | Arcand | 33/758 |
| 6,115,931 A | * | 9/2000 | Arcand | 33/668 |
| 6,546,644 B2 | * | 4/2003 | Poineau et al. | 33/755 |
| 6,637,126 B2 | * | 10/2003 | Balota | 33/770 |
| 2002/0011008 A1 | * | 1/2002 | Nelson et al. | 33/770 |

* cited by examiner

Primary Examiner—G. Bradley Bennett
(74) Attorney, Agent, or Firm—Troxell Law Office PLLC

(57) ABSTRACT

An improved structure for the endpiece of tape rule, said endpiece comprises a squeeze mechanism and a fixing plate perpendicular to said squeeze mechanism; wherein the rear portion of said fixing plate is riveted with the measuring tape, its front end is formed together with a perpendicular inserting plate, said inserting plate is inserted into a central mounting plate; by using a pivot to connect said inserting plate with a clamping plate in said squeeze mechanism, said squeeze mechanism would be rotated and its position would be changed, such that it is adapted for measuring an object from different positions.

9 Claims, 8 Drawing Sheets

STRUCTURE FOR THE ENDPIECE OF TAPE RULE

BACKGROUND OF THE INVENTION

1. Field of the Invention

The present invention relates to a construction of the endpiece of a tape rule. Especially to a construction of the endpiece of a tape rule, which can be rotated and secured in different positions, so as to measure articles from different directions and provide an extra utilization of the bottom surface of measuring tape.

2. Description of the Prior Art

It is known to public that the tape rule is a motive and convenient measuring tool. As shown in FIG. 1, in general, the measuring tape B of conventional tape rule is reserved in a housing C. At the end portion of the measuring tape, there is an endpiece A. Said endpiece A contains a connecting plate A1 to be attached onto the end of the measuring tape B, and a hook plate A2 perpendicularly extended from the connecting plate A1. By using the hook plate A2 of the endpiece A, the measuring tape would not be completely pulled into the housing C after measuring is performed. Then, in using the tape rule, it is merely necessary for people to pull the endpiece A and then put the endpiece A against the surface of an article.

However, said endpiece A of tape ruler has some disadvantages as follows:

Firstly, in order to make the hook plate of the endpiece be connected to the measuring tape as an entity, and to prevent inconvenience of carrying the tape rule due to the endpiece. The area of hook plate A2 is made as small as possible. However, since the hook plate A2 is used to hook onto an edge portion of an article, after it is fixed, the measuring tape then is pulled out according to the movement of people, such that the length or distance to be measured is obtained. If the area of hook is too small, it is difficult to hook onto an article and easy to slide away from the article to cause instant rewinding of measuring tape. It is then harmful to the user.

Secondly, since the hook plate A2 is extended in one direction, this construction enables the conventional tape rule to measure the length of articles only in one direction. It then presents a problem, for example, when a user wishes to hook onto the underside edge of an object, it is then inconvenient in uses.

In addition, since the hook plate A2 is extended in one direction, the bottom surface of the measuring tape then become useless, and the usage of tape ruler is limited.

SUMMARY OF THE INVENTION

It is an object of the present invention to provide an improved structure for the endpiece of tape rule to overcome limitations and disadvantages of tape rule as described above.

According to the improved structure for the endpiece of tape rule of present invention, there is a squeeze mechanism forming the hook portion of the endpiece. The position and hooking angle of the clamping plates of said squeeze mechanism can be changed, such that the tape rule of present invention can be used to measure objects from different directions.

According to the improved structure of the endpiece of present invention, since the clamping plates of said squeeze mechanism are rotatable, the bottom surface of measuring tape can be printed with scales for measuring objects having underside edges etc. This is another object of present invention.

According to the improved structure of the endpiece of present invention, since the convexed bottom surface of measuring tape can be printed with scales for measuring objects at this stage, the concaved surface of measuring tape is turned down and the two side edges of the measuring tape then would attach to the surface of the object, then it is not only convenient to measure but also convenient to accurately note marks on the surface of the object.

DETAILED DESCRIPTION OF THE PREFERRED EMBODIMENT

Figure 1:
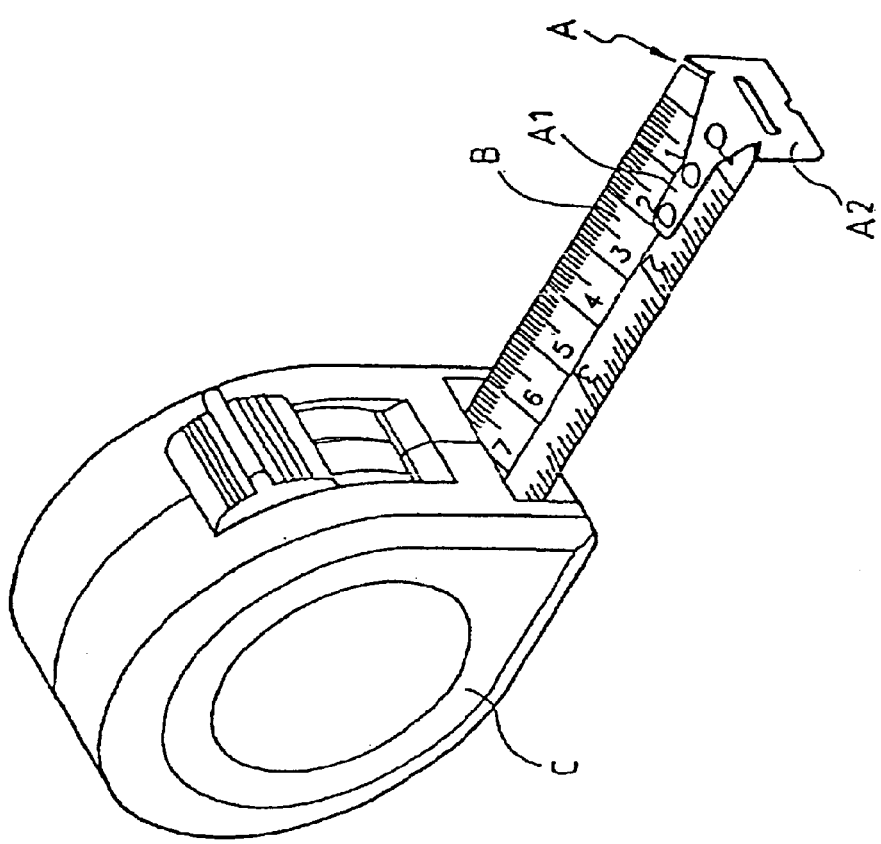
FIG. 1 is a perspective view of conventional tape rule.
Figure 2:
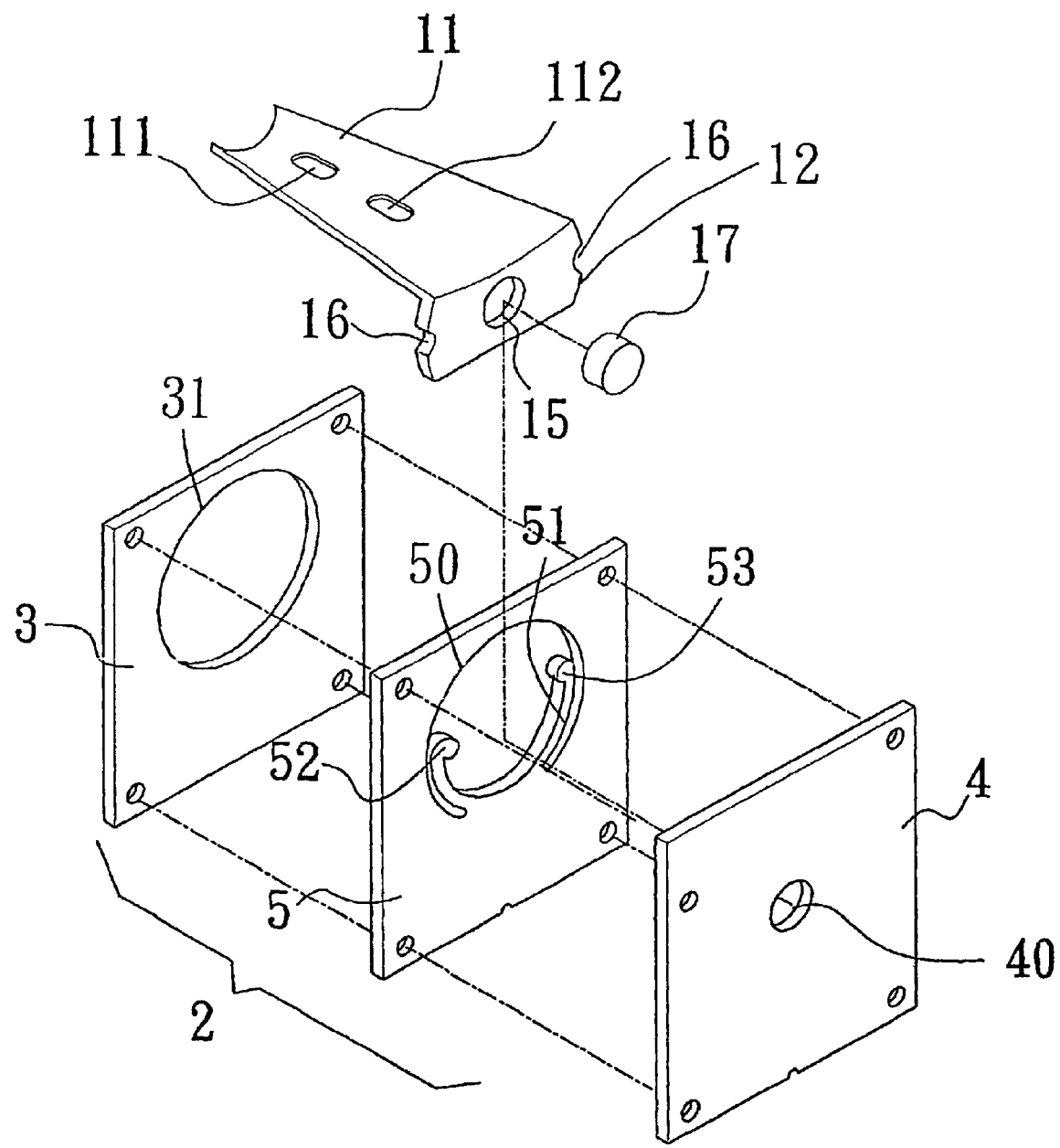
FIG. 2 is an exploded perspective view showing the construction of the endpiece of present invention.
Figure 3A:
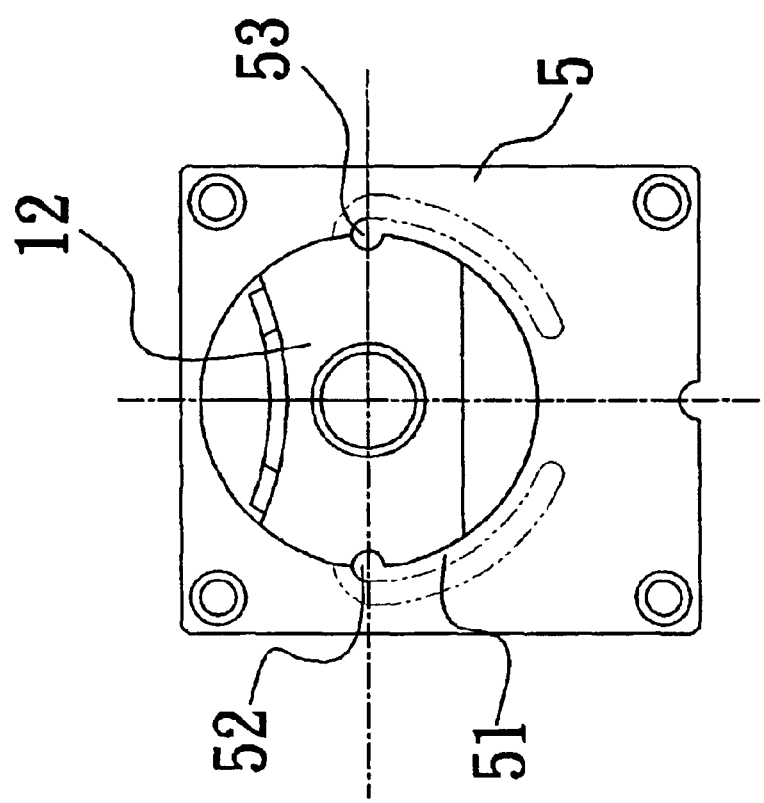
FIG. 3A is a plane view showing the combination of present invention.
Figure 3B:
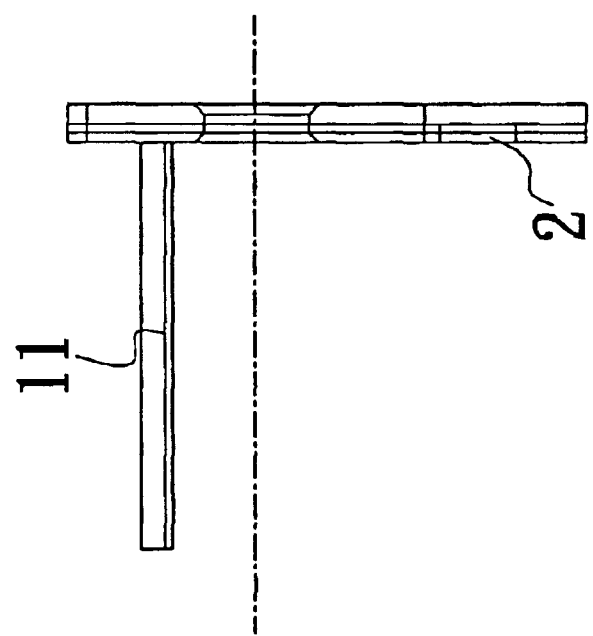
FIG. 3B is a side view of FIG. 3A.

According to the improved structure of the endpiece of tape rule of present invention, as shown in FIGS. 2, 3A & 3B, the endpiece 1 includes a fixing plate 11, an inserting plate 12 and a squeeze mechanism 2. On the rear portion of the fixing plate, a plurality of mounting holes 111, 112 are formed, such that it is firmly attached to the end of measuring tape by rivets or another mechanical element. An inserting plate 12, perpendicular to the fixing plate 11 is formed on the front edge of the inserting plate 12 with it. Said inserting plate 12 is a flat plate with its two side edges formed in a shape of circular arc. On the inserting plate 12, there is a rivet hole 15 for holding a rivet element 17; and there is a small stop hollow 16 formed on each surface of the side edges of the inserting plate 12.

The squeeze mechanism 2 contains a front clamping plate 3, a rear clamping plate 4, and a central mounting plate 5. Said front clamping plate 3 and rear clamping plate 4 clamp the central mounting plate 5 together between them to form a perpendicular hooking plate. A circular hole 31 is formed in the front clamping plate 3; a circular hole 50 corresponding to said circular hole 31 is also formed in the central mounting plate 5; there is also a half circular buckle clip 51 partially connected with the upper surface of the bottom edge of said circular hole 50, such that the ends of the buckle clip 51 are flexible. The ends of said buckle clip 51 are formed as two extruded ears 52, 53. When the inserting plate 12 is inserted into the circular hole 50 from its open mouth, said extruded ears 52, 53 would mount into the stop hollows 16 formed on the surfaces of the side edges of the inserting plate 12. Besides, said rivet hole 15 formed at the center of said inserting plate 12 is opposite with the rivet hole 40 formed on the rear clamping plate. Therefore, the rivet element 17 hold in the rivet hole 15 formed on the inserting plate 12 is operated as a pivot of said squeeze mechanism 2.

Figure 4A:
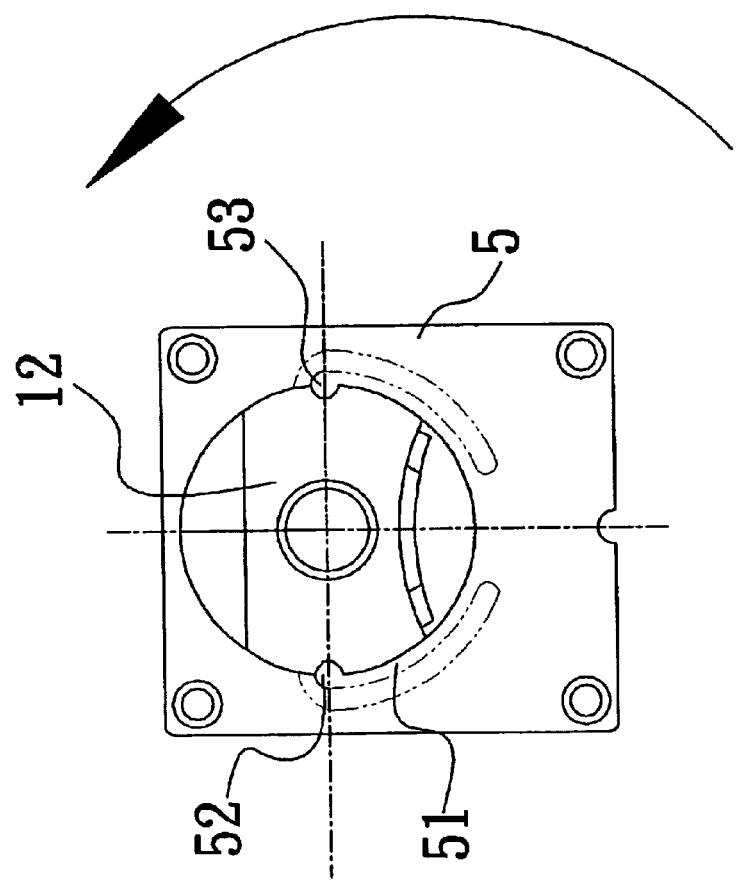
FIG. 4A is a plane view showing the squeeze mechanism after being rotated.
Figure 4B:
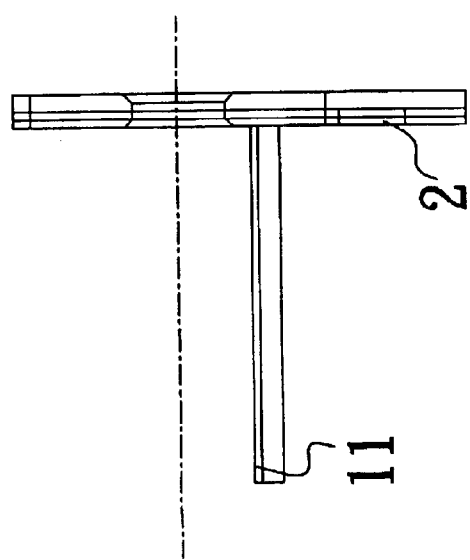
FIG. 4B is a side view of FIG. 4A.

As shown in FIGS. 4A and 4B, since the central part of said squeeze mechanism 2 is inserted with an inserting plate 12 which is formed together with said fixing plate 11 to be fixed onto the end portion of measuring tape. And, said inserting plate 12 is pivotally combined with the rear clamping plate 4 by said rivet 17. Then the squeeze mechanism 2 is rotatable with the rivet 17 as a pivot. And, the inserting plate 12 can be stopped by the ends 52, 53 of said buckle clip 51 to be mounted into the stop hollows 16 formed on the surfaces of the side edges of the inserting plate 12. Consequently, the position of the plates 3, 4, 5 included in the squeeze mechanism 2 in corresponding to the fixing plate 11 or the measuring tape is adjustable.

Figure 5A:
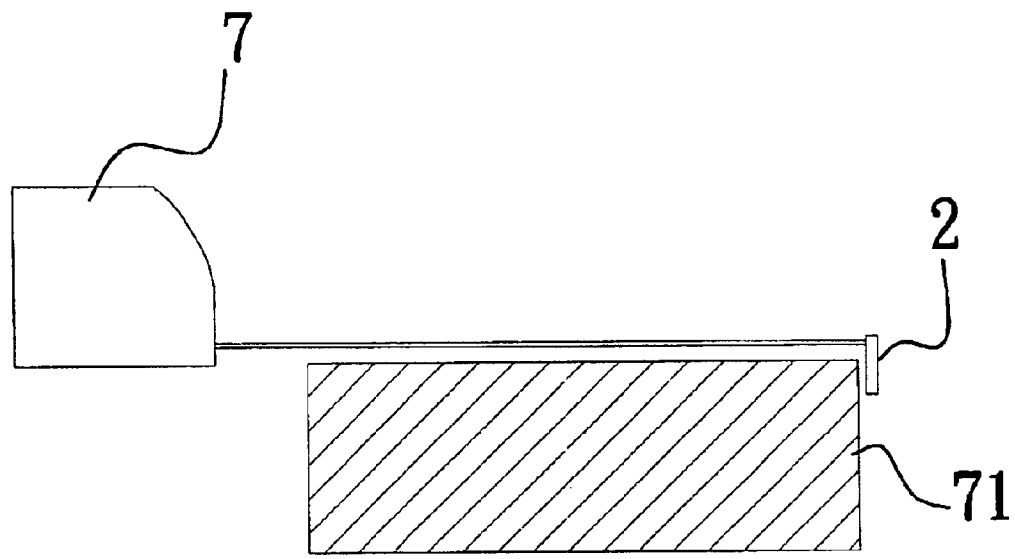
FIG. 5A is a side view showing an example of using the present invention.
Figure 5B:
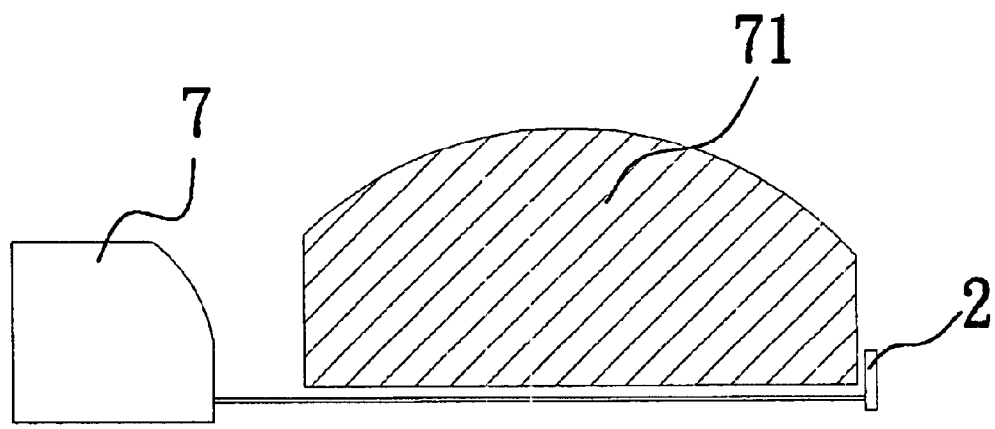
FIG. 5B is a side view showing another example of using the present invention.

Again as shown in FIGS. 5A and 5B, after the endpiece of the present invention is combined with the measuring tape of tape rule 7. By rotating the squeeze mechanism 2 to adjust the perpendicular hooking plate formed by combining said front clamping plate 3, rear clamping plate 4, and central mounting plate 5 to be in upward or downward position. Then length of the object 71 can be measured from its upper surface or its bottom surface. For example, the underside of a table also can be easily measured. It would not be limited due to the different locations.

Figure 6:
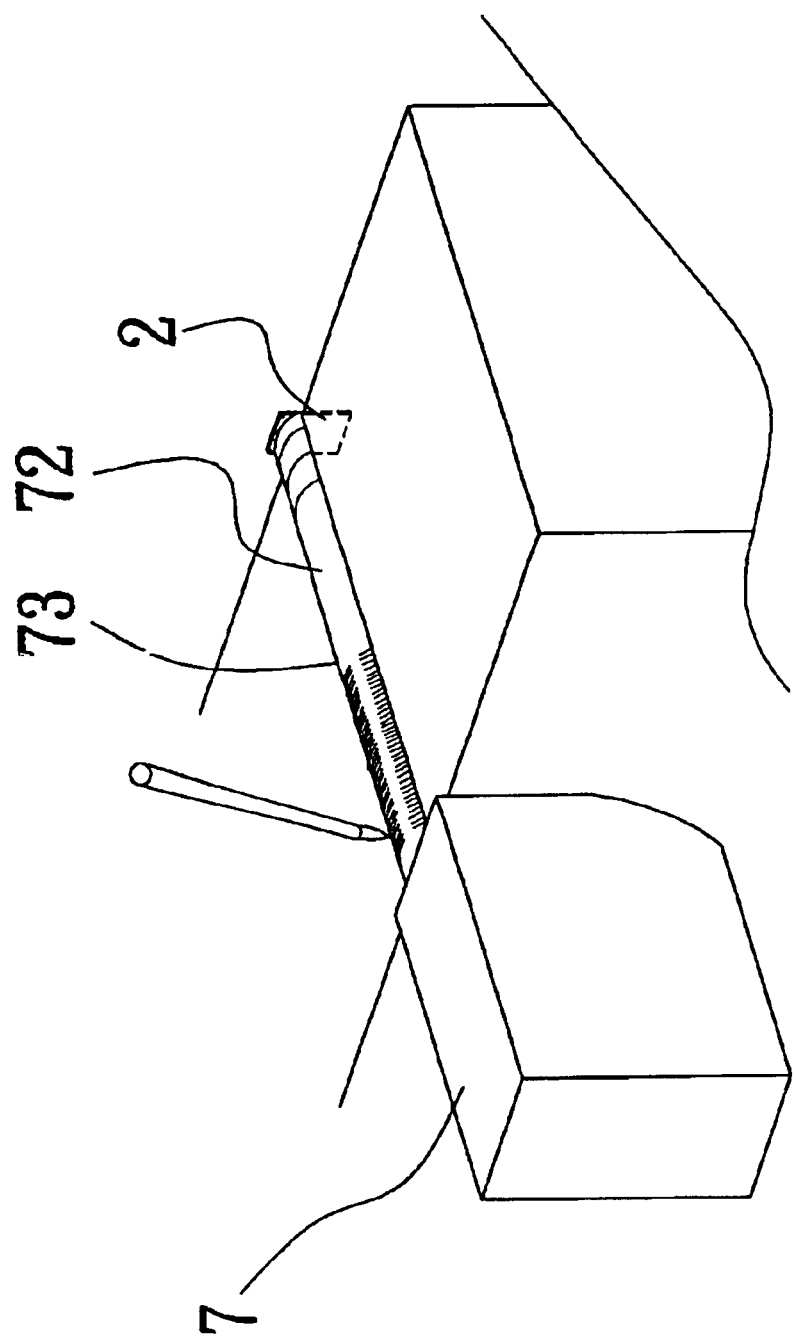
FIG. 6 is a perspective view showing an additional example of using the present invention.

In addition, as shown in FIG. 6, since the squeeze mechanism 2 can be rotated in 180°, the convexed bottom surface of the measuring tape would be no more useless, that is, the convexed bottom surface 72 of the measuring tape can be printed with measuring scales. When the squeeze mechanism 2 is turned for 180° to hook another object, the two side edges of measuring tape would closely attach to the surface of the object, the measurement would be much more accurate and the measuring tape can be used as a rule for drawing.

Figure 7:
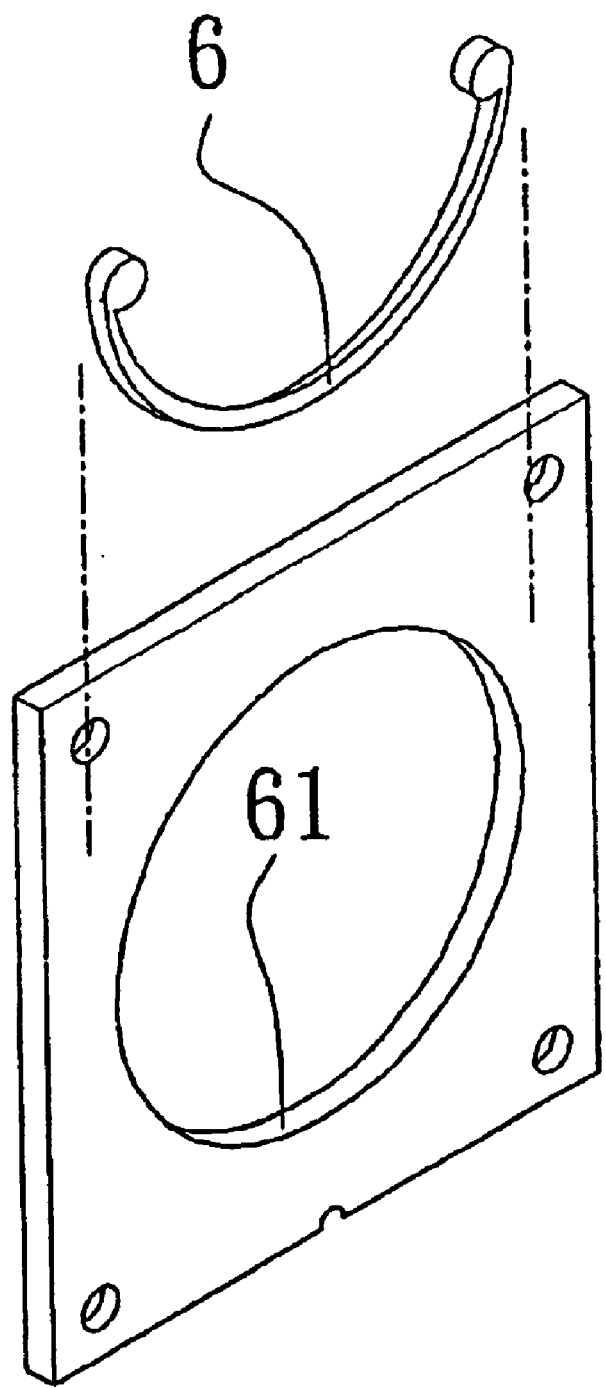
FIG. 7 is a perspective view showing another preferred embodiment of present invention.
Figure 8A:
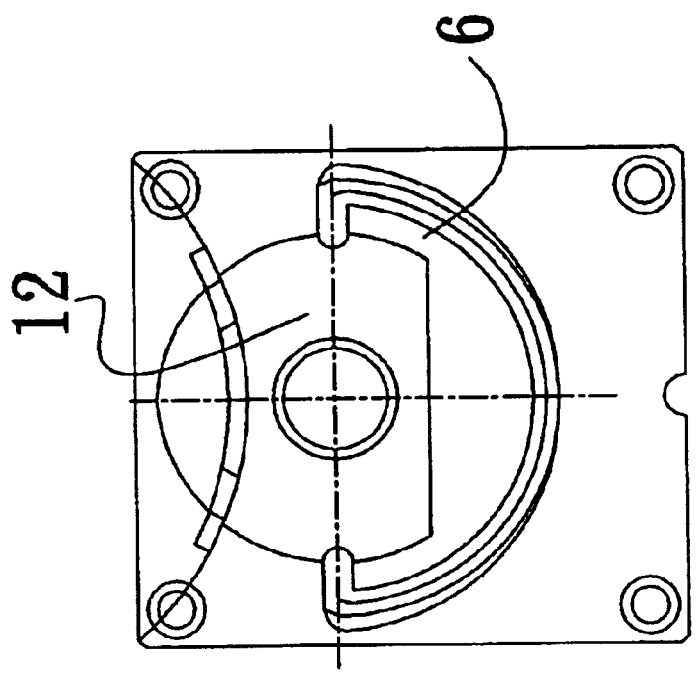
FIG. 8A is a plane view showing the preferred embodiment of the structure of present invention as shown in FIG. 7.
Figure 8B:
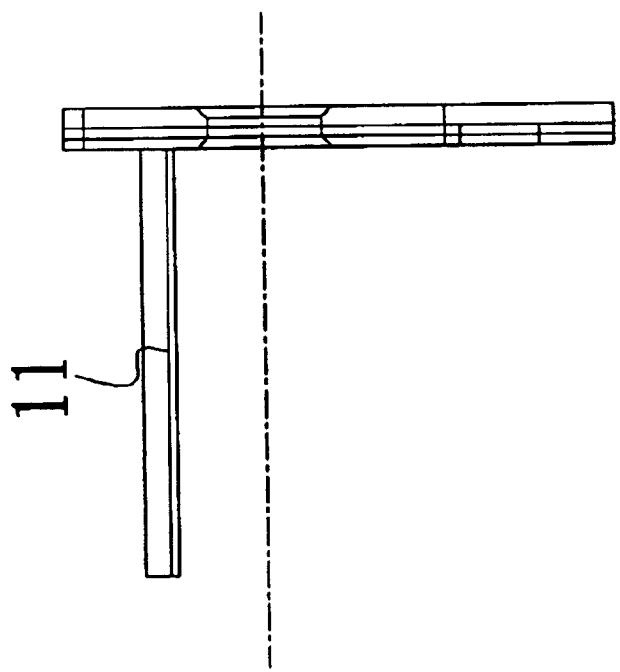
FIG. 8B is a side view of FIG. 8A.

Furthermore, as shown in FIGS. 7, 8A, and 8B, according to the improved structure for the endpiece of tape rule of present invention, the buckle clip 51 of the central mounting plate 5 of the squeeze mechanism 2 formed as a buckle ring 6 can be separated from the body of the central mounting plate 5. By putting the separated buckle ring 6 into the circular hole 61 formed in the central mounting plate 5, then an identical function of squeeze mechanism still can be obtained.

In conclusion from above, by using the rotatable endpiece of the measuring tape of a tape rule disclosed above, the tape rule would be adapted for measuring objects at different positions. It also can effectively increase the security in using the tape rule. There is no identical structure for the endpiece of a tape rule has ever seen by people. It is then an invention of novelty.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An improved structure for the endpiece of tape rule, said endpiece of tape rule comprising:

a fixing plate for attaching to the end of measuring tape of tape rule;

a squeeze mechanism having a front clamping plate, a rear clamping plate and a mounting plate between said clamping plates to combine together; and an inserting plate to be combined with a clamping plate of said squeeze mechanism;

such that said squeeze mechanism including said clamping plates can be rotated to change its location.

2. An improved structure for the endpiece of tape rule as claimed in claim 1, wherein a rivet element is fixed to a hole formed at the central part of said inserting plate.

3. An improved structure for the endpiece of tape rule as claimed in claim 1, wherein said fixing plate is formed together with said inserting plate.

4. An improved structure for the endpiece of tape rule as claimed in claim 2, wherein said inserting plate is a plate with its two side edges formed in a shape of circular arc, while said central mounting plate has a hole for said inserting plate to be put into.

5. An improved structure for the endpiece of tape rule as claimed in claim 3, wherein said inserting plate has a pair of small stop hollows formed on the surfaces of its side edges.

6. An improved structure for the endpiece of tape rule as claimed in claim 4, wherein said central mounting plate has a half circular buckle clip partially connected with the upper surface of the bottom edge of the circular hole formed in said central mounting plate.

7. An improved structure for the endpiece of tape rule as claimed in claim 5, wherein the ends of said half circular clip are formed as two extruded ears to mount into the stop hollows formed on the surfaces of the side edges of said inserting plate.

8. An improved structure for the endpiece of tape rule claimed in claim 5, wherein said half circular clip is separated with said central mounting plate.

9. An improved structure for the endpiece of tape rule as claimed in claim 6, wherein the ends of said half circular clip are formed as two extruded ears to mount into the stop hollows formed on the surfaces of the side edges of said inserting plate.

* * * * *